(12) United States Patent
Pang et al.

(10) Patent No.: US 11,877,153 B2
(45) Date of Patent: Jan. 16, 2024

(54) METHOD OF AUTHENTICATION OF WIRELESS COMMUNICATION BASED ON PHYSICAL LAYER SECURITY

(71) Applicant: Hitachi Energy Ltd, Zürich (CH)

(72) Inventors: Zhibo Pang, Vasteras (SE); Michele Luvisotto, Vasteras (SE); Fei Pan, Chengdu (CN); Ming Xiao, Taby (SE); Roger Jansson, Vasteras (SE)

(73) Assignee: HITACHI ENERGY LTD, Zürich (CH)

( * ) Notice: Subject to any disclaimer, the term of this patent is extended or adjusted under 35 U.S.C. 154(b) by 108 days.

(21) Appl. No.: 17/438,803

(22) PCT Filed: Mar. 11, 2020

(86) PCT No.: PCT/EP2020/056430
§ 371 (c)(1),
(2) Date: Sep. 13, 2021

(87) PCT Pub. No.: WO2020/182849
PCT Pub. Date: Sep. 17, 2020

(65) Prior Publication Data
US 2022/0150698 A1 May 12, 2022

(30) Foreign Application Priority Data
Mar. 14, 2019 (EP) .................... 19162697

(51) Int. Cl.
*H04W 12/065* (2021.01)
*H04W 12/03* (2021.01)
(Continued)

(52) U.S. Cl.
CPC ........ *H04W 12/065* (2021.01); *H04B 7/0626* (2013.01); *H04L 5/0007* (2013.01);
(Continued)

(58) Field of Classification Search
CPC .. H04L 5/0007; H04W 12/065; H04W 12/03; H04W 12/122; H04W 84/12; H04B 7/0626
(Continued)

(56) References Cited

U.S. PATENT DOCUMENTS 7,953,389 B2   5/2011  Coleman et al.
8,280,046 B2 * 10/2012  Rudolf .................. H04L 9/0875
                                              713/168
(Continued)

FOREIGN PATENT DOCUMENTS

CN   104168562 A   11/2014
CN   105959337 A   9/2016
(Continued)

OTHER PUBLICATIONS

Liu et al. "A Two-Dimensional Quantization Algorithm for CIR-Based Physical Layer Authentication", IEEE, 2013 (Year: 2013).*
(Continued)

*Primary Examiner* — Saleh Najjar
*Assistant Examiner* — Peiliang Pan
(74) *Attorney, Agent, or Firm* — Procopio, Cory, Hargreaves & Savitch LLP

(57) ABSTRACT

In an embodiment, a communication method, using OFDM (Orthogonal Frequency Division Multiplexing), comprises transmitting and receiving packets between a first node and at least one second node, where each packet comprises a preamble and payload data. The method, performed by the first node, may comprise receiving packets from the at least one second node, and authenticating the at least one second node based on physical layer characteristics, i.e., on CSI (Channel State Information). The authenticating may be based on a plurality of preambles, which are extracted from a group of consecutively received packets.

18 Claims, 4 Drawing Sheets

(51) Int. Cl.
*H04W 12/122* (2021.01)
*H04B 7/06* (2006.01)
*H04L 5/00* (2006.01)
*H04W 84/12* (2009.01)

(52) U.S. Cl.
CPC ......... *H04W 12/03* (2021.01); *H04W 12/122* (2021.01); *H04W 84/12* (2013.01)

(58) Field of Classification Search
USPC .......................................................... 726/2
See application file for complete search history.

(56) References Cited

U.S. PATENT DOCUMENTS

| | | | |
|---|---|---|---|
| 8,433,894 B2 | 4/2013 | Reznik et al. | |
| 8,931,053 B2* | 1/2015 | Wang | H04W 12/065 713/168 |
| 9,282,435 B2 | 3/2016 | Ward et al. | |
| 9,538,569 B2* | 1/2017 | Carlton | G06F 3/0482 |
| 9,800,612 B2 | 10/2017 | Harvey et al. | |
| 2006/0197702 A1 | 9/2006 | Jones | |
| 2008/0137761 A1 | 6/2008 | Stadelmeier et al. | |
| 2010/0131751 A1* | 5/2010 | Reznik | H04L 63/16 370/252 |
| 2012/0201315 A1 | 8/2012 | Zhang et al. | |
| 2014/0169245 A1 | 6/2014 | Kenney et al. | |
| 2015/0334131 A1* | 11/2015 | Harvey | H04L 63/1483 726/1 |
| 2016/0241314 A1 | 8/2016 | Ferrante et al. | |
| 2019/0036739 A1* | 1/2019 | Lindskog | H04L 25/0226 |
| 2020/0195344 A1* | 6/2020 | Jungnickel | H04B 10/60 |
| 2021/0385901 A1* | 12/2021 | Mildh | H04W 76/30 |

FOREIGN PATENT DOCUMENTS

| | | |
|---|---|---|
| CN | 107104960 A | 8/2017 |
| WO | 2010/033802 A1 | 3/2010 |

OTHER PUBLICATIONS

International Search Report and Written Opinion of the International Searching Authority for related PCT application No. PCT/EP2020/056430 dated Apr. 8, 2020, 14 pages.

Tugnait et al., "A Channel-Based Hypothesis Testing Approach To Enhance User Authentication in Wireless Networks", 2010 Second International Conference on, IEEE, Piscataway, NJ, USA, Jan. 5, 2010, pp. 1-9, XP031648956, ISBN: 978-1-4244-5487-7, 9 pages.

Pan et al., "Authentication Based on Channel State Information for Industrial Wireless Communications", 2018, National Key Lab of Commun., University of Elec. Science and Tech. of China, ABB Corporate Research, Sweden, 6 pages.

Jiang, "Wireless Communication Networks for Time-critical Industrial Applications", Licentiate Thesis, Stockholm, Sweden, 2018, KTH Royal Institute of Technology, School of Electrical Engineering, ISBN 978-91-7729-998-1, 40 pages.

* cited by examiner

METHOD OF AUTHENTICATION OF WIRELESS COMMUNICATION BASED ON PHYSICAL LAYER SECURITY

CROSS-REFERENCE TO RELATED APPLICATIONS

The present application is a national stage entry of International Patent App. No. PCT/EP2020/056430, filed on Mar. 14, 2019, which claims priority to European Patent App. No. 19162697.7, filed on Mar. 14, 2019, which are both hereby incorporated herein by reference as if set forth in full.

BACKGROUND

Field of the Invention

The present invention relates to wireless communication, such as communication methods and systems for industrial monitoring and control purposes, such as monitoring and controlling an electric power system, monitoring and controlling equipment in an industrial manufacturing facility, and/or for other industrial automation control and monitoring purposes, and including authentication in industrial wireless communication methods, such as in so-called machine-to-machine communication.

Related Art

An example of industrial communication related to the present disclosure is communications for the monitoring and control of electric power grids, wherein wired communications, compliant with IEC 61850, may be used that provide time slots of some micro-seconds or lower. In, for example, electric substation automation for the control and monitoring of electric power distribution, the requirements for reliability and low latency are comparably high. On the other hand, such communications will often have lower requirements on data transmission capacity, or bandwidth, than for example entertainment, such as film and television.

Using wired communications has drawbacks in cost, and wireless alternatives are sought after for in industrial automation. However, wireless communication standards like IEEE (Institute of Electrical and Electronics Engineers) 802.11, e.g. IEEE 802.11g, introduce latencies, since such standards are not optimized for communication that require low latency, and therefore do not provide an alternative that can compete with wired communications in terms of latency. Also, wireless communication may in general be more vulnerable to intrusive attacks, such as e.g. spoofing, than wired communications that are protected for example by the use of fiber optics that makes it more difficult for an intruder to interfere.

An example of known authentication methods performed in the PHY-layer (physical layer) is authentication based on CSI (Channel State Information). CSI based authentication is beneficial compared to cryptographic methods using key encryption, since, when using an encryption key, an intruder may perform repeated attempts to reveal the encryption key, basically until the attack succeeds.

A CSI based method may use estimates of CIR (Channel Impulse Response) to authenticate communication. The channel estimations made for channel decoding in IEEE 802.11 are also used for packet authentication and, thus, the preambles are also used for counteracting intrusion. To provide reliable decoding, IEEE 802.11g uses a preamble of five OFDM symbols for each data packet, which preamble is used for channel estimation purposes. The preamble is used for channel estimation purposes, and can be used for CSI based authentication. However, the latency of such communication is too large for many industrial appliances.

Using a preamble for each data packet consisting of only one OFDM symbol reduces latency to become of similar size as wired communication. However, a CSI based authentication process that needs a preamble of each data packet that comprises for example five OFDM to perform an estimation of the CIR cannot be used.

Thus, there is a need for an alternative method for authenticating wireless communication, which authentication method are not based on CIR estimations that require large preambles that introduce latency, e.g. preambles comprising five OFDM symbols, but instead can be performed in wireless communications using shorter preambles for the data packets, especially, for wireless communications where each data packet comprises a short preamble in order to avoid latency, preferably a preamble consisting of only one, or two, OFDM symbols.

SUMMARY OF INVENTION

An aim of the present invention is to provide a method for wireless communication suitable for industrial appliances, such as industrial automation, which wireless communication method utilize an authentication with security performance similar to the previous physical layer CSI authentication methods of the prior art, however without the drawback of latency of the previous methods.

For this purpose, in accordance with a first aspect, an embodiment of a communication method is disclosed.

By utilizing preambles from a plurality of consecutive packets, each packet can have a comparably short preamble consisting of few OFDM symbols, e.g. one OFDM symbol, in order to ensure a comparably short latency. At the same time, the number of OFDM symbols used for the CSI based authentication can be larger since the preambles of more than one packet is used for this authentication. Because a packet comprises one or more OFDM symbols, it may be referred to as an OFDM packet.

Thus, the method utilizes one preamble from each packet, and the authentication is based on CSI derived from a group consisting of a plurality of consecutive packets received from the second node. Preferably the CSI of the group is compared to a corresponding reference CSI for communication with the second node.

In an embodiment of the first aspect, each preamble consists of not more than two OFDM symbols, preferably one single OFDM symbol.

In an embodiment of the first aspect, the authentication comprises comparing the CSI of the preamble of each packet of the group to a reference CSI, and accumulating the result of the comparisons from all packets of the group.

In a further embodiment of the first aspect, the method comprises comparing the accumulated results to a threshold, and setting an alarm indicating intrusion in case the accumulated results exceed the threshold.

In a further embodiment of the first aspect, the method comprises obtaining training sequences from the at least one second node, and set the reference CSI and/or the authentication threshold in view of the CSI of the received training sequences. Thus, an embodiment of the first aspect comprises evaluating the training sequences and setting the threshold based on the evaluation, and an embodiment of the first aspect comprises analyzing, preferably statistically, the training sequences and setting the reference CSI based on analysis of the training sequences.

In an embodiment of the first aspect, the method uses a CIR (Channel Impulse Response) as CSI. Thus, the method includes estimating the CIR from the received packets and the estimation of the CIR concerning communication received from the second node is used as CSI.

In accordance with a second aspect, an embodiment provides a communication node.

In accordance with a third aspect, an embodiment provides a computer program and computer program product.

BRIEF DESCRIPTION OF DRAWINGS

Embodiments of the invention will now be described with reference to the accompanying drawings, in which.

DESCRIPTION OF EMBODIMENTS

Figure 1:
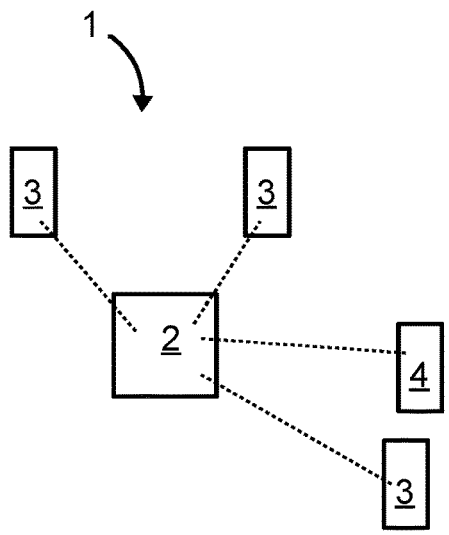
FIG. 1 illustrates a wireless communication network.

FIG. 1 illustrates a wireless communication network 1 having a star configuration where a network controller, central node, first node or master node 2 is connected to a plurality of second nodes, or slave nodes, 3. The wireless communication network 1 exemplifies a typical industrial communications network for monitoring and controlling of equipment, such as communication in a production facility, a manufacturing process or an electric power system. Such industrial wireless communication may also be referred to as wireless machine-to-machine communication. Each slave node 3 has an RF (radio-frequency) front-end that enables wireless communication with the central master node 2, in order to control and monitor the actual equipment of the slave node. In a substation, the equipment may for example constitute switches, breakers, transformers, electric lines, controllable capacitors or machines, or an energy storage. FIG. 1 also exemplifies an intruder 4. A wireless network relying on cryptography or passwords is vulnerable to intruders that can utilize computing power and time to crack this defense. Using a physical layer protection, such as CSI, enhances security since the spatial distance between a slave node 3, i.e. a legitimate node, and an intruder 4 will influence the channel characteristics so that an intrusion is detected. In wireless networks 1 where the mobility of the nodes and the environment are small, monitoring channel characteristics, such as CSI, can be especially effective and reliable for detecting intrusion. In for example electric power substations, the slave nodes 3, such as all the nodes, may be stationary, which makes CSI protection especially suitable. In many other industrial communication networks used in industrial automation, such as manufacturing or processing systems, the mobility is small and slow, making CSI based protection beneficial.

Figure 2A:
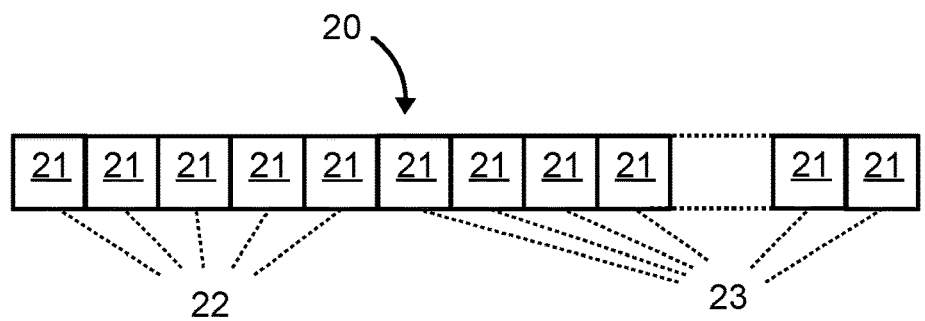
FIGS. 2A-C illustrate data packets.
Figure 2B:
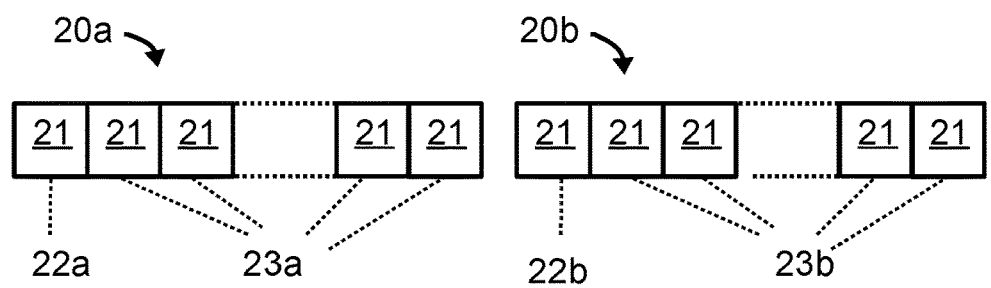
Figure 2C:
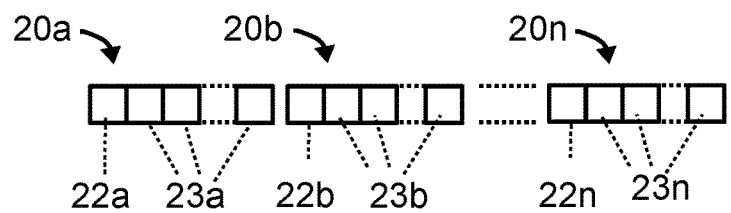

FIGS. 2A-C illustrate data packets 20. FIG. 2A illustrates one data packet 20 in an OFDM communication system. The data packet 20 comprises OFDM symbols 21 and may therefore be referred to as an OFDM packet. The OFDM symbols 21 are divided into two groups: a preamble 22 on the one hand and data 23, or payload data, on the other hand. The preamble 22 of the data packet in FIG. 2A comprises five OFDM symbols. The preambles 22a-n of the data packets 22a-n exemplified in FIGS. 2B-C comprise only one single OFDM symbol 21. Although data packets 20a-n with short preambles 22a-n consisting of only one or two OFDM symbols 21 are preferred, embodiments can be used in communication systems utilizing longer preambles 22, e.g. such as five as illustrated in FIG. 2A. Embodiments may use preambles 22a, 22b, 22n from a plurality of consecutive data packets 20a-n, as illustrated in FIG. 2C.

Figure 3:
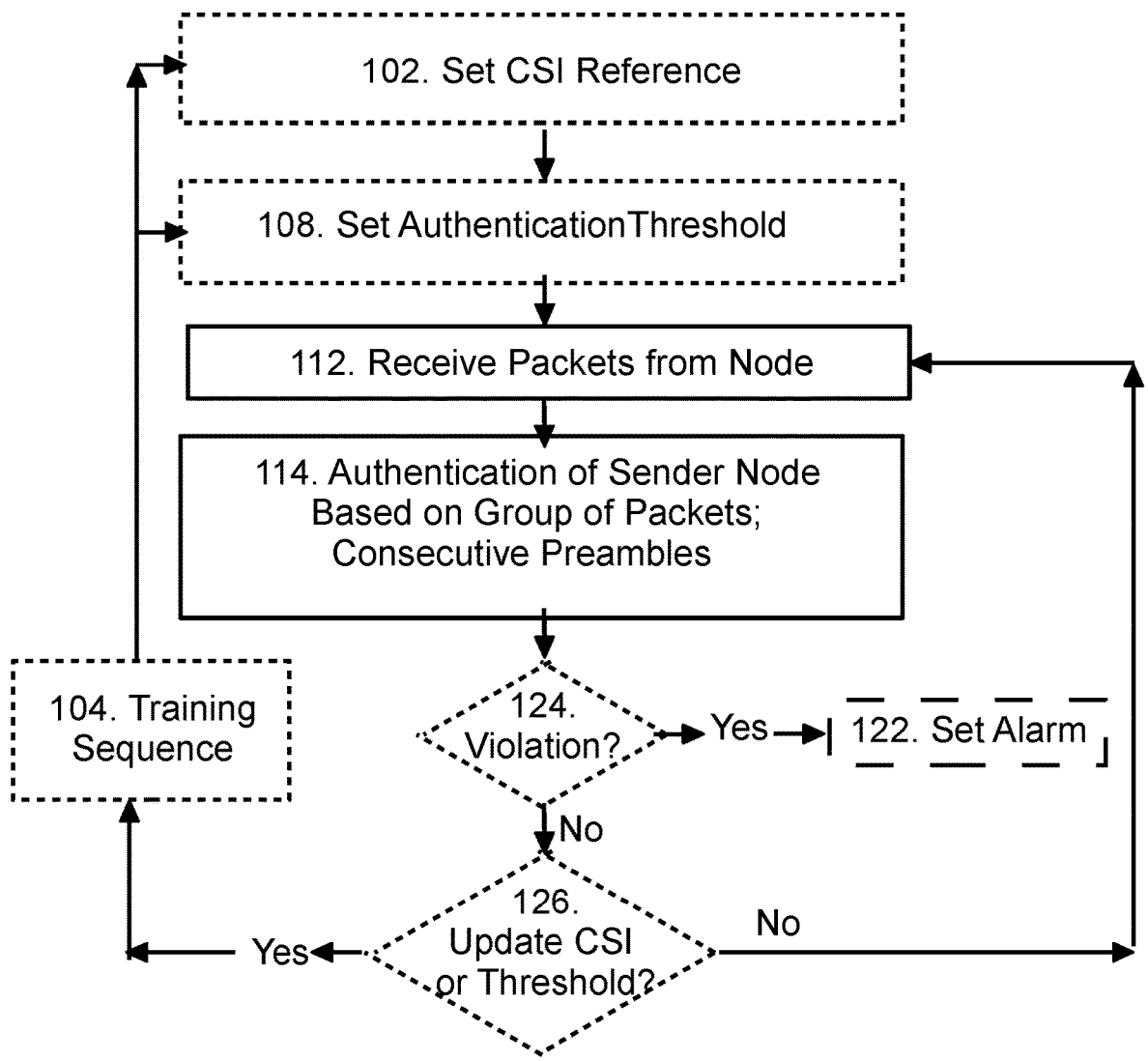
FIG. 3 illustrates an embodiment of a method of communication.

FIG. 3 illustrates a communication method according to an embodiment. The communication method 100 includes receiving 112 packets from a node (such as a second node or slave node 3 in FIG. 1) and authenticating 114 the sending node 3. The communication method 100 may typically be performed by a master node, or controller, 2, or by a second node, or slave node 3 that acts as a receiving node. The main example given here is wherein a master node 2 authenticates a slave node 3, however, any slave node 3 may authenticate the master node 2 in the same way. The receiving node 2, 3 receives 112 a plurality of consecutive packets 20a, 20b, 20n and authenticates 114 the sender node 3, 2 based on these received packets 20a-n as a group. The authentication 114 is based on a plurality of preambles 22a-n extracted from the packets 20a-n of the group of packets. The number of packets in a group will depend on the number of OFDM symbols 21 needed for a reliable CSI based authentication, and the number can be determined in the same way as when performing CSI based authentication of one single packet, but instead of all OFDM symbols belonging to the same packet 20, the preambles belong to a number of consecutive packets 20a-n.

The authentication 114 of the sender node includes comparing CSI of the received preambles with a CSI reference. If the CSI, such as the CIR, of the received packets differs more than a threshold from the CSI reference, the method may suitably include setting 122 an alarm, for example indicating intrusion in a wired communication network to which the node is connected at the industrial facility, such as electric power substation or other industrial automation facility such as in an automated manufacturing process. Thus, the method may include determining 124 whether the threshold is violated, and setting 122 an alarm if so, i.e. if the result of the authentication 114 indicates intrusion.

The communication method may include setting 102 the CSI reference. The communication method 100 may include setting 108 the authentication threshold. The setting 102 of CSI reference and the setting 108 of the authentication threshold may suitable be based on analysis of received training signals. Thus, the process may include obtaining 104 training sequences from the sender node, and setting 102 the CSI reference based on a statistical analysis of the CSI of the received training sequences. Also, the setting 108 of the authentication threshold may be based on an evaluation or analysis of the received training sequences.

The CSI reference and the authentication threshold may be updated, suitably when an update time has lapsed, and the communication method 100 may include one or more steps for determining 126 whether the CSI reference and/or the authentication threshold should be updated. Such an updating time should suitably be set in view of the industrial process in question, and stationary nodes in an environment with small or no mobility of radio frequency interfering equipment can be expected to have a longer time between such updates than nodes arranged in an environment that affects radio transmission and thus affects the CSI, such as the CIR.

Figure 4:
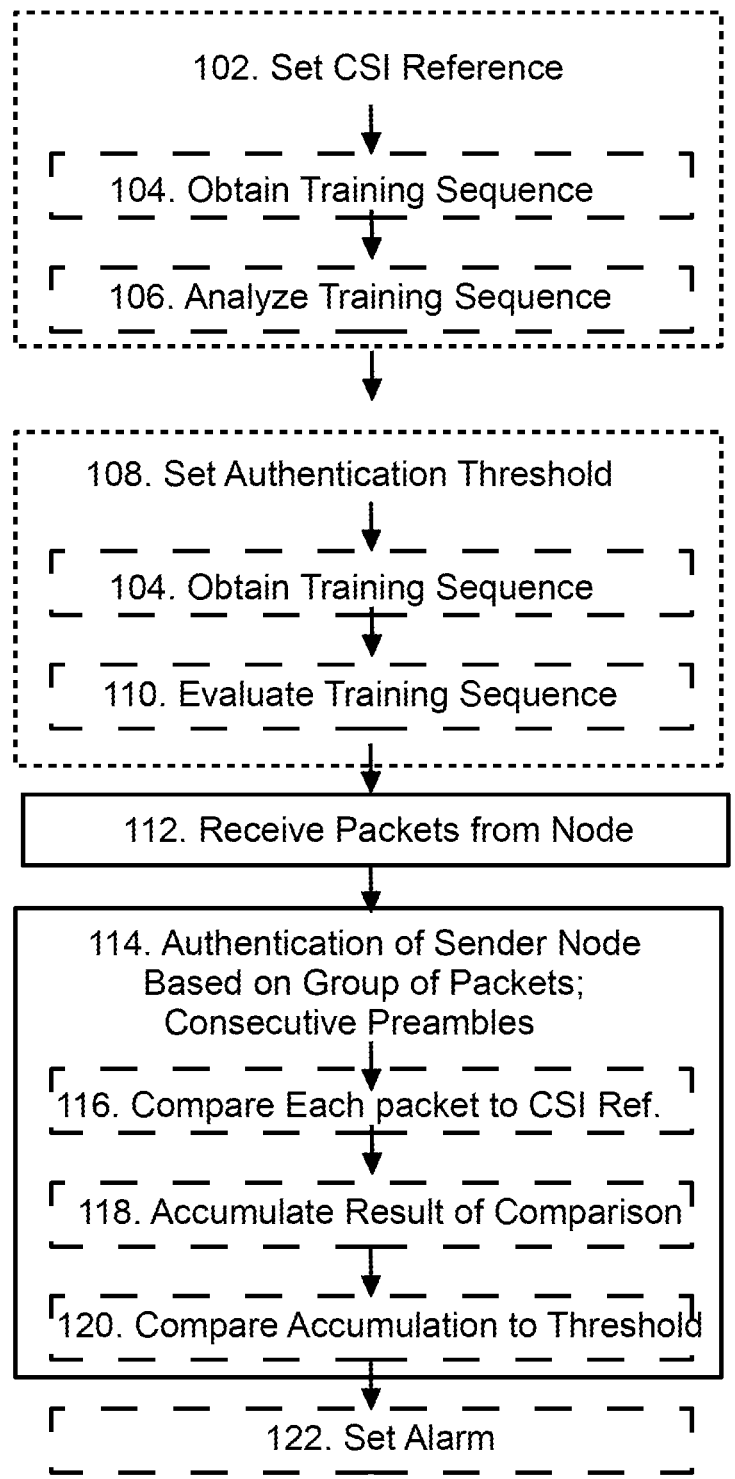
FIG. 4 illustrates an embodiment of a method of communication.

FIG. 4 illustrate an embodiment similar to the embodiment of FIG. 3, were the setting 102 of CSI reference, the setting 108 of authentication threshold and the authentication 114 are illustrated in more detail.

The setting 102 of CSI reference may be based on a statistical analysis 106 of a training sequence. Also, the setting 108 of authentication threshold may be based on evaluation 112 of a training sequence, suitably the same training sequence as used for setting 102 the CSI reference. The threshold may be set so that an expected variation of the CSI, such as the CIR, should not result in an alarm, and therefore a variation determined when evaluating the training sequence should not violate the authentication threshold. Thus, the setting 102 of reference and the setting 108 of threshold may include obtaining 104 a training sequence, suitably the same training sequence, which training sequence may include a hundred to some thousands, or about one thousand, of OFDM symbols. The authentication 114 of the sender node may be based on the group of received packets and include comparing 116 each packet to the CSI reference. The method 100, especially the authentication 114 of the node, may also include accumulating 118 determined differences between the CSI of received packets and the CSI reference, and subsequently comparing 120 the accumulated deviations from the CSI reference with the authentication threshold. The comparing 120 of accumulated differences may be based on a suitable metric, such as an Euclidean norm. When setting 108 the authentication threshold based on the training sequence obtained (in 104), the same metric may suitably be used as when comparing 120 accumulated deviations of the CSI of the received packets from the CSI reference.

Figure 5:
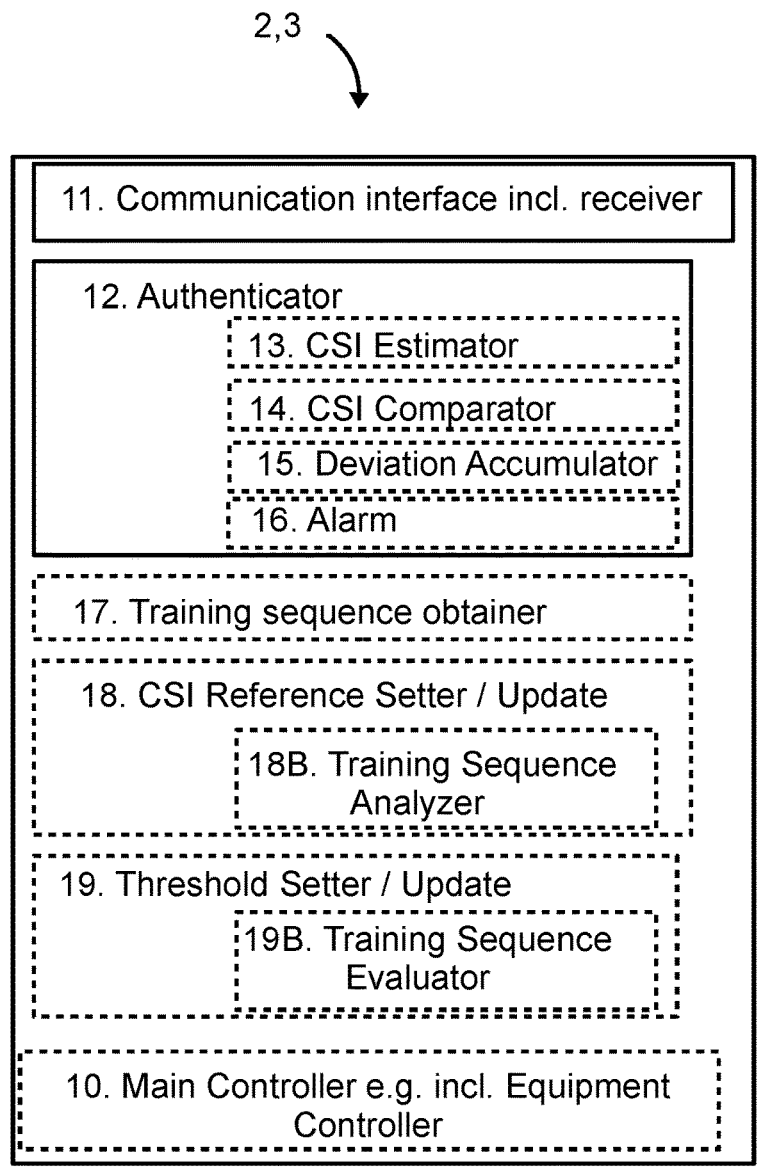
FIG. 5 illustrates an embodiment of a communication node configured to perform the methods of FIGS. 3 and 4.

FIG. 5 illustrate some parts of a communication device, or communication node 2, 3 of an embodiment. The communication node 2, 3 is configured to perform any of the disclosed methods, including the embodiments described in relation to FIGS. 3 and 4. The communication node 2, 3 consists of a combination of software and hardware and FIG. 5 illustrates some functionality, especially functionality related to disclosed embodiments, that is achieved by the communication node 2, 3. The functionality is shown as functional blocks. FIG. 5 is a simplified illustration of the construction of the communication node 2, 3 and focuses on illustrating the communication functionality of the communication node 2, 3, and especially focuses on the functionality utilized for authentication.

The communication node 2, 3 comprises a communication interface 11 and a main controller 10. The main controller 10 can be configured for monitoring and controlling equipment in an industrial setting. Such equipment may in an electric power system, or in a power substation, include for example switches, breakers, transformers, generators, controllable capacitors, or voltage source converters. The communication interface 11 includes a transmitter and receiver and is configured to communicate wirelessly in a communication system 1 with other communication nodes 2, 3, such as a master node 2 and slave nodes 3. The communication node 2, 3 comprises an authenticator 12 configured to authenticate another communication node 2, 3, especially perform the authentication 114 based on a number of preambles 22, 22a-n from consecutive packets 20, 20a-n received from the communication node 2, 3 that should be authenticated. The authenticator 12 preferably comprises respective function units for performing the different measures 116, 118, 120, 122 of the previously disclosed wireless communication method of FIG. 4.

The authenticator 12 comprises a CSI estimator 13 and a CSI comparator by means of which the communication node is configured to estimate the CSI of the preamble of each packet and compare the CSI to a CSI reference (see the comparing 116 in FIG. 4). The authenticator further includes a deviation accumulator 15 configured to accumulate (see 118 of FIG. 4) the deviations from the CSI reference, wherein the communication node 2, 3 is adapted to accumulate all the deviations used for the authentication, including the deviations from at least two consecutive packets 20a-n. The authenticator 12 further includes an alarm unit 16 configured to compare said accumulated deviations to a threshold and configured to set an alarm when the threshold is exceeded and the received packets violate the authentication criteria, corresponding to the comparing 120 of accumulated CSI deviation to the threshold and setting 122 of an alarm in FIG. 4, and the determining of an authentication violation 124 and setting of alarm 122 in FIG. 3.

The communication node 2, 3 is also configured to set 102, or update, a CSI reference, and to set 108, or update, the authentication threshold. For these purposes 102, 108, the communication node is provided with a training sequence obtainer 17 configured to obtain 104 a training sequence, e.g. including to initiate and receive training sequences from one or more communication nodes 2, 3 that should be authenticated. The communication node 2, 3, preferably the CSI reference setter 18, also includes a training sequence analyzer for effectuating the analyzing of the training sequence when performing the previously disclosed setting 102 of the CSI reference. In similar fashion, the communication node 2, 3, preferably the threshold setter 19, also includes a training sequence evaluator for effectuating the analyzing of the training sequence when performing the previously disclosed setting 108 of the authentication threshold. The CSI reference setter 18 and/or the threshold setter 19 may preferably include a timer configured to determine 126 whether the CSI reference or the authentication threshold, respectively, should be updated.

Embodiments of the communication node 2, 3 are configured to perform the methods of FIG. 3 and FIG. 4; and embodiments of the communication method include the methods and functionalities provided with the communication node 2, 3 described in relation to FIG. 5.

A communication method 100 comprising transmitting and receiving packets 20, 20a-n between a first node 2 and at least one second node 3 has been described in embodiments, together with a communication node 2, 3 configured to perform the method including said embodiments. In these embodiments, the packet comprises a preamble 22, 22a-n and payload data 23, 23a-n. The method is performed by the first node 2 and comprises:
  receiving 114 packets 20, 20a-n from the at least one second node,
  authenticating 112 the at least one second node based on physical layer characteristics, i.e. on CSI, such as CIR. Especially, the authenticating 112 is based on a plurality of preambles 22a-n, which preambles 22a-n are extracted from a group of consecutively received packets 20a-n.

Figure 6:
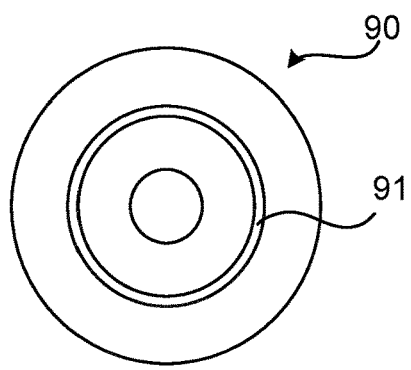
FIG. 6 shows a computer-readable medium.

FIG. 6 shows a computer-readable optical medium 90. The methods of FIGS. 3 and 4 may be implemented as a computer program 91 (software) comprising instructions which, when the program is executed by a programmable computer, cause the computer to carry out any of these methods. In particular, the instructions may be such as to cause a communication node 2, 3, which functions as first node, master node or controller in the sense described above, to carry out the method of FIG. 3 or 4. The computer program 91 may be stored or distributed on a computer-readable medium 90 like the one shown in FIG. 6. Further computer-readable media include non-volatile (including permanent and non-permanent storage) and volatile media, such as random access memory, magnetic, optical or solid-state memory, fixed and movable memory drives. Computer-readable media may further be systematized as non-transitory media, including storage media, and transitory media, such as a modulated electromagnetic or optical wave carrying information.

The present invention is, however, not limited to these disclosed embodiments but may be varied by the skilled person within the scope of the attached claims.

The invention claimed is:

1. A communication method using OFDM (Orthogonal Frequency Division Multiplexing) comprising transmitting and receiving packets between a first node and at least one second node, where each packet comprises a preamble and payload data, said method being performed by the first node and comprising:
   receiving packets from the at least one second node;
   extracting a plurality of preambles from a group of consecutively received packets; and
   authenticating the at least one second node based on accumulated deviations in a Channel Impulse Response (CIR) derived from the plurality of preambles, wherein the authenticating comprises
   comparing the CIR of the preamble of each packet of the group of consecutively received packets to a reference CIR, and
   accumulating the result of the comparisons from all packets of the group as the accumulated deviations.

2. The method according to claim 1, each of said preambles consisting of not more than two OFDM symbols.

3. The method according to claim 1, further comprising:
   obtaining training sequences from the at least one second node;
   analyzing the training sequences; and
   setting the reference CIR based on analysis of the training sequences.

4. The method according to claim 1, further comprising:
   comparing the accumulated deviations to a threshold; and
   setting an alarm indicating intrusion in case the accumulated deviations exceed the threshold.

5. The method according to claim 4, further comprising:
   obtaining training sequences from the at least one second node;
   evaluating the training sequences; and
   setting the threshold based on the evaluation.

6. The method according to claim 1, wherein said first node is a master node, and each second node is a slave node.

7. The method according to claim 1, wherein said first node is a slave node, and the second node is a master node.

8. The method according to claim 1, wherein the first node is connected to a wireless local area network.

9. The method according to claim 8, wherein the wireless local area network comprises a wireless Ethernet network.

10. The method according to claim 8, wherein the wireless local area network comprises a network according to IEEE (Institute of Electrical and Electronics Engineers) 802.11 standards.

11. The method according to claim 1, each of said preambles consisting of one single OFDM symbol.

12. A communication node using OFDM (Orthogonal Frequency Division Multiplexing), wherein packets are transmitted and received between the communication node and a further communication node, each packet comprises a preamble and payload data, and said communication node comprises:
   a communication interface for receiving packets from the further communication node; and
   an authenticator for extracting a plurality of preambles from a group of consecutively received packets, and authenticating the further communication node based on accumulated deviations in a Channel Impulse Response (CIR) derived from the plurality of preambles, wherein the authenticating comprises
   comparing the CIR of the preamble of each packet of the group of consecutively received packets to a reference CIR, and
   accumulating the result of the comparisons from all packets of the group as the accumulated deviations.

13. The communication node according to claim 12, each of said preambles consisting of not more than two OFDM symbols.

14. The communication node according to claim 12, wherein the authenticating further comprises:
   comparing the accumulated deviations to a threshold; and
   setting an alarm indicating intrusion in case the accumulated deviations exceed the threshold.

15. The communication node according to claim 14, further comprising a training sequence obtainer configured to:
   obtain training sequences from the further communication node;
   analyze the training sequences; and
   set the reference CIR based on analysis of the training sequences.

16. A non-transitory computer-readable medium storing instructions that, when executed by a processor of a first node, cause the processor to carry out a communication method using OFDM (Orthogonal Frequency Division Multiplexing) comprising transmitting and receiving packets between the first node and at least one second node, where each packet comprises a preamble and payload data, said communication method comprising:
   receiving packets from the at least one second node;
   extracting a plurality of preambles from a group of consecutively received packets; and
   authenticating the at least one second node based on accumulated deviations in a Channel Impulse Response (CIR) derived from the plurality of preambles, wherein the authenticating comprises
   comparing the CIR of the preamble of each packet of the group of consecutively received packets to a reference CIR, and
   accumulating the result of the comparisons from all packets of the group as the accumulated deviations.

17. The non-transitory computer-readable medium according to claim 16, each of said preambles consisting of not more than two OFDM symbols.

18. The non-transitory computer-readable medium according to claim 16, wherein the authenticating further comprises:
   comparing the accumulated deviations to a threshold; and
   setting an alarm indicating intrusion in case the accumulated deviations exceed the threshold.

* * * * *